United States Patent Office 3,179,715
Patented Apr. 20, 1965

3,179,715
VULCANIZED ELASTOMERS AND METHODS
OF MAKING THE SAME
Giulio Natta, Giovanni Crespi, and Mario Bruzzone,
Milan, Italy, assignors to Montecatini Società Generale
per l'Industria Mineraria e Chimica, a corporation of
Italy
No Drawing. Filed June 10, 1958, Ser. No. 741,014
Claims priority, application Italy, June 14, 1957, 8,983/57
6 Claims. (Cl. 260—878)

This invention relates to vulcanized elastomers and to methods for making them.

An object of this invention is to produce substantially saturated vulcanized elastomers (synthetic rubbers) having very good mechanical and elastic properties.

Surprisingly, we have been able to produce new vulcanized elastomers from substantially saturated amorphous, linear pre-formed copolymers containing monomeric units derived from ethylene and monomeric units derived from alpha-olefins of the formula $CH_2=CHR$ where R is a lower alkyl (1–5 carbon atoms) radical, by vulcanizing the pre-formed copolymers with a polymerizable unsaturated monomeric aliphatic or aromatic hydrocarbon like styrene and divinyl benzene, i.e. hydrocarbons containing at least one carbon-to-carbon double bond in the molecule, in the presence of a radical initator, that is a substance which initiates the reaction of the unsaturated hydrocarbon with the pre-formed copolymer by a free radical mechanism.

Substantially saturated linear, amorphous, elastomeric copolymers of the higher alpha-olefins with ethylene containing 20% to 80% of ethylene in their macromolecules, can be produced by the method described in the pending application of Natta et al., Ser. No. 629,085, filed December 18, 1956. In said method, the monomers are co-polymerized in an inert hydrocarbon solvent with the aid of a catalyst prepared from a hydrocarbon-soluble vanadium compound and a metalorganic compound of a metal of groups II and III of the table.

The copolymers used as starting material in the present method may be obtained by such processes.

The polymerizable unsaturated hydrocarbon (which can be free of highly polar functional groups) reacted with the copolymer may be, for example, styrene, divinyl benzene, butadiene, isoprene, dimethylbutadiene, or other similar monomeric polymerizable hydrocarbon. Mixtures of the polymerizable monomeric hydrocarbons may be used.

The radical initiator (substance which initiates reaction of the styrene or the like with the preformed copolymer by a free radical mechanism) may be a peroxide, hydroperoxide, or perester. For instance, the radical initiator may be dibenzoyl peroxide, dicumyl peroxide, tert. butyl peroxide, chlorobenzoyl peroxide, tert. butyl perbenzoate, etc. The radical initiator may be in the form of peroxide or hydroperoxide groups substituted on the chains of the copolymer as the result of a peroxidizing pre-treatment thereof.

The pre-formed copolymer can be mixed with the styrene or other monomeric polymerizable hydrocarbon, and with the radical initiator in mixers of the kind commonly used for natural and synthetic rubbers. The temperature of the mixing, and other conditions, depend on the particular polymerizable compound and radical initiator used, as well as on the concentration of those substances in the mixture.

In general, the polymerizable unsaturated compound, e.g., styrene, butadiene, etc., is used in an amount of 5 to 40 parts per 100 parts of the pre-formed copolymer, the radical initiator is used in an amount of 0.5 to 10 parts per 100 parts of the pre-formed copolymer, and the mixing is performed at a temperature between 30° C. and 70° C. The vulcanization of the mixture is effected at a temperature above the mixing temperature, usually between 100° C. and 250° C. for a time which may vary between 20 minutes and one hour, depending on the temperature employed.

The elastomers we obtain have a relatively low initial elastic modulus and a high ultimate tensile strength. The stress-elongation curve for these elastomers is of a type that is characteristic of products which crystallize under stretch.

An important advantage of our present elastomers is that they have a high ultimate tensile strength even when they are not modified by the addition of reinforcing fillers. This is in direct contrast to the synthetic rubbers which have been known heretofore.

The density of our elastomers is always below 1.0 kg./dm.$^3$. This low density is of great advantage for many uses of the elastomers.

The initial elastic modulus and wear resistance of our elastomers are satisfactory for many purposes. However, synthetic rubbers having a higher initial elastic modulus and increased wear resistance can be obtained by mixing the present elastomers with the fillers commonly used for reinforcing rubber, such as, for instance, metal oxides, silicates, silica, carbon black, etc.

The elastomers obtained by our present method are transparent. This is a distinct advantage when colorless rubbers are desired or required. The inherent transparency of the elastomers makes it possible to incorporate dyeing pigments with them to obtain a wide range of colors, in light or deep shades, while preserving their transparency.

The production of our new substantially saturated vulcanized elastomers from the starting linear, amorphous alpha-olefin copolymers can be explained as follows:

As a consequence of the decomposition of the radical initiator, or of groups, such as peroxide or hydroperoxide group, present in the starting copolymers and which are capable of decomposing according to a radical mechanism, free radicals can be formed on the chains of the pre-formed copolymer.

In the presence of the polymerizable unsaturated aliphatic or aromatic hydrocarbon which we mix with the pre-formed copolymer, the free radicals probably start polymerization reactions leading to the formation of cross-links between the copolymer chains, or to the formation of branches on those chains. Which phenomenon occurs depends on whether the chain termination reaction takes place by (1) coupling with a radical situated on another chain of the copolymer, or (2) by coupling with another free radical not bound to the chains of the copolymer, such as, for instance, a radical supplied by the initiator.

The following reactions can illustrate the course of the reaction, when styrene is used as the polymerizable unsaturated compound:

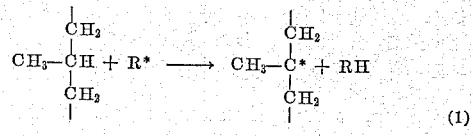

(1)

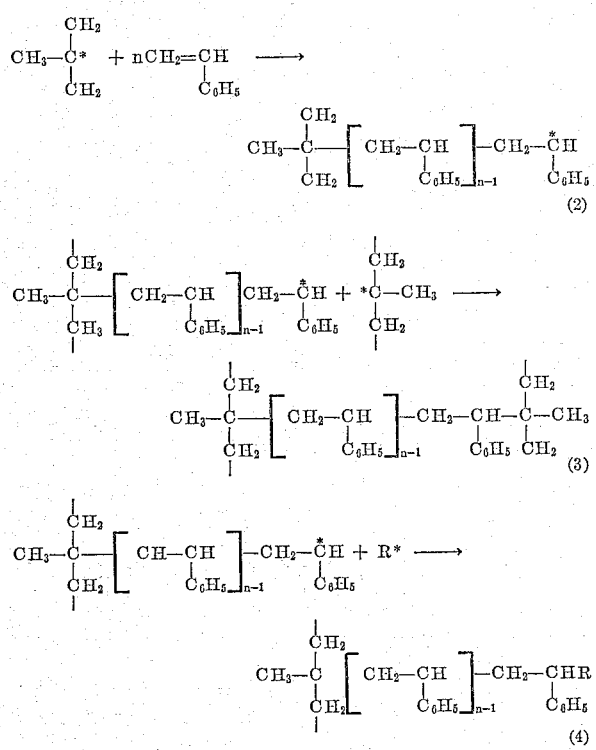

In reaction (4), branch-formation takes place because the chain termination reaction is originated by a radical supplied by the initiator.

The characteristics of the elastomer obtained depend essentially on the cross-linking according to reaction (3), and therefore are determined by whether reaction (3) or reaction (4) takes place prevailingly.

Divinyl benzene contains two double bonds providing two sites of polymerization. When divinyl benzene is used instead of styrene, it is more likely, therefore, that a chain formed by the divinyl benzene and grafted on the preformed copolymer according to reaction (2) will terminate on another chain of the copolymer, thus causing cross-linking of the chains. In fact, we find that elastomers having improved mechanical characteristics can be obtained by using divinylbenzene instead of styrene, the concentration and other vulcanization conditions being equal.

Table I below gives the main mechanical characteristics of vulcanized products we obtained by mixing a linear, amorphous copolymer of ethylene and propylene containing 57 mols percent of ethylene with styrene and divinyl benzene, respectively, and with 1.0 part of dicumyl peroxide per 100 parts of the copolymer as radical initiator, and vulcanizing the mass at 160° C. for 30 minutes.

TABLE I

| Styrene parts per 100 parts of polymer | DVB [1] parts per 100 parts of polymer | Ultimate tensile strength, kg./cm.$^2$ | Elongation at break, percent | Modulus 200% elongation, kg./cm.$^2$ |
| --- | --- | --- | --- | --- |
| 10 | | 35 | 750 | 9 |
| | 10 | 45 | 500 | 15 |
| 40 | | 180 | 840 | 13 |
| | 40 | 205 | 580 | 31 |

[1] DVB is a mixture containing 60.5% divinylbenzene, 15.4% ethylvinylbenzene and 24.1% saturated aryalkyl hydrocarbon.

The advantages gained by using unsaturated monomeric hydrocarbons which contain two or more polymerizable double bonds as the polymerizable unsaturated ingredients of our mix is evident from Table I. It can be assumed that when the compounds having two or more polymerizable double bonds, such as divinyl benzene, butadiene, and substituted butadiene, are used, the branches formed by reactions of type (4) can be reactivated by free radicals and that, therefore, the possibilities for cross-linking are increased.

Our vulcanized elastomers and method for making them are different from what has been disclosed previously in this art.

Thus, earlier applications of G. Natta and others disclose the production of elastomers (rubber-like materials) from the linear, substantially saturated, amorphous alpha-olefin homopolymers by vulcanizations with unsaturated organic compounds having one or more functional acidic groups in the molecule, in the presence of radical initiators. It was also shown that by including polyfunctional basic substances such as, for example, metal oxides, in that vulcanization mix, elastomers having improved mechanical and elastic properties are obtained. The elastomers obtained from the mix containing the metal oxides have a higher density and a higher initial elastic modulus than those obtained from the mix without the addition of the metal oxide. However, when the amount of metal oxide introduced into the mix is stoichiometrically in excess of the acidic groups present, the resulting elastomers are opaque. Moreover, the introduction of polar groups grafted on the polymer chain has an adverse effect on the electrical characteristics of the polymer and can render the normally hydrophobic polymer hydrophilic to a certain extent.

In contrast, the vulcanized elastomers produced by our present method are inherently transparent and have essentially the same electrical and water-resistance properties as the amorphous copolymers from which they are made.

It is known, also, that radical initiators can cause cross-linking of the chains of saturated hydrocarbon polymers like polyethylene, and that such cross-linking is due, essentially, to a coupling of radicals formed on the polymer chain by reaction with the initiator. However, such cross-linking is almost always accompanied by degradation of the main chains of the polymers. The degradation occurs even when tertiary carbon atoms are present in the polymer.

The presence of given groups, or of double bonds, in the polymer can determine whether cross-linking of the polymer chains, or degradation of those chains, will take place prevailingly. Thus it has been reported (see "Physical Chemistry of High Polymeric Systems," by Mark and Tobolsky, Interscience Publ., New York, 1950, p. 486) that side methyl groups can determine a prevalence of the scission reactions.

Since radical initiators cause scission reactions and aggregation reactions (the latter being either cross-linking reactions or branching reactions), it is evident that if the concentration of the radical initiator mixed with a given polymer is increased, either the degradation or the cross-linking can be increased depending on which of those two reactions was predominant originally, i.e., prior to increase in the radical initiator concentration.

When substances which are capable of forming stable radicals (e.g. hexaphenylethane), peptizing agents, radical initiators in general, or some types of antioxidants are mixed with the saturated hydrocarbon polymers, the degradation reactions take place prevailingly because those substances tend to block the radicals present in the polymer chains, thus preventing their coupling and consequently preventing the formation of cross-links. Also, the radical initiator can partake in chain termination reactions.

When the linear, substantially saturated amorphous copolymers of propylene with ethylene having ethylene-to-propylene ratios comprised within wide limits are reacted with various radical initiators, there is a considerable prevalence of the aggregation reactions over the scission reactions.

From those copolymers, therefore, vulcanized products which are insoluble in the usual solvents for the starting copolymers and which have a good impact resilience and rather good mechanical characteristics can be obtained. By increasing the concentration of the radical initiator, it is possible to obtain different types of elastomers having rather good mechanical characteristics. This is probably due to the fact that although the primary chains do have a very reduced length in the vulcanized polymer, the cross-linking is greatly increased.

Nevertheless, we have established that the elastomers produced by the method of our present invention are both different from and superior to the products obtained by reacting the pre-formed alpha-olefin polymers and copolymers with the radical initiator only.

Table II below gives the main mechanical characteristics of elastomers obtained by mixing the ethylene-propylene copolymer of Table I with various amounts of dicumyl peroxide as radical initiator (no polymerizable substance such as styrene or the like used), and vulcanizing the mix at 160° C. for 30 minutes.

TABLE II

| DCP parts per 100 parts of polymer | Ultimate tensile strength, kg./cm.$^2$ | Elongation at break, percent | Modulus at 200% elongation, kg./cm.$^2$ |
| --- | --- | --- | --- |
| 1 | 46 | 775 | 10 |
| 2 | 32 | 600 | 13 |
| 3 | 23 | 400 | 15 |

DCP is dicumylperoxide.

The values given in Table II should be contrasted with those given in Table III below for the product we obtain by mixing the same ethylene-propylene copolymer with styrene and 1.0 part of dicumylperoxide per 100 parts of the copolymer, and vulcanizing the mixture at 160° C. for 30 minutes.

TABLE III

| DCP parts per 100 parts of copolymers | Styrene parts per 100 parts of copolymers | Ultimate tensile strength, kg./cm.$^2$ | Elongation at break, percent | Modulus at 200% elongation, kg./cm.$^2$ |
| --- | --- | --- | --- | --- |
| 3 | --- | 25 | 400 | 15 |
| 3 | 40 | 105 | 620 | 17 |
| 2 | --- | 32 | 600 | 13 |
| 2 | 40 | 165 | 750 | 15 |

The comparison shows that the properties of the vulcanized elastomers we obtain by our present method are clearly superior to those of the vulcanized products obtained using the radical initiator alone, even when the polymerizable substance included in our mix contains only one polymerizable double bond.

The polymerizable unsaturated compound, e.g. styrene or divinylbenzene, if present in sufficiently high concentration, serves to decrease the polymer degradation because the free radicals present in the alpha-olefin polymer chain are immediately captured by the styrene, etc. before scission reactions of the polymeric chains can take place.

It is thus possible to effect various degrees of cross-linking of the amorphous copolymer chains by varying the amount of the polymerizable unsaturated aliphatic or aromatic hydrocarbon mixed with the pre-formed copolymer. Table IV below shows the main mechanical characteristics of products obtained from the ethylene-propylene copolymer of Table I by mixing the copolymer with various concentrations of divinylbenzene (polymerizable unsaturated compound) and 2 parts by weight per 100 parts of the copolymer of dicumylperoxide (radical initiator).

TABLE IV

| DVB[1] parts per 100 parts copolymer | Ultimate tensile strength, kg./cm.$^2$ | Elongation at break, percent | Modulus at 200% elongation, kg./cm.$^2$ |
| --- | --- | --- | --- |
| --- | 32 | 600 | 13 |
| 10 | 58 | 500 | 16 |
| 20 | 115 | 450 | 33 |
| 40 | 135 | 450 | 37 |

Vulcanization at 160° C. for 30 minutes.

[1] The DVB was a mixture containing 60.5% divinylbenzene, 15.4% ethylvinylbenzene, 24.1% saturated arylalkyl hydrocarbons.

As will be apparent, the characteristics of the elastomers obtained according to the present method can be varied over a wide range, depending on the amount and type of polymerizable unsaturated compound, and of radical initiator, used.

The following examples are given to illustrate the invention, it being understood that these examples are not intended to be limiting.

*Example 1*

100 parts of a linear ethylene-propylene copolymer containing 43% by weight of propylene and having a molecular weight of about 200,000 (determined by viscosimetry) are mixed with 20 parts of a crude divinylbenzene (containing 60.5% divinylbenzene, 15.4% ethylvinylbenzene and 24.1% saturated arylalkyl hydrocarbons). 2.4 parts of di-tert. butylperoxide are added and the whole is homogenized for 10 minutes.

The mixture is then vulcanized for 20 minutes at 200° C. in a press with closed molds under a pressure of about 70 kg./cm.$^2$. From the foil obtained, specimens are taken according to ASTM D 412–51T, and are subjected to mechanical tests at room temperature, with a rate of separation of the grips of 50 mm./minute.

The vulcanized product has the following mechanical characteristics:

Ultimate tensile strength _____kg./cm.$^2$__ 125
Elongation at break _____percent__ 720
Modulus at 200% elongation _____kg./cm.$^2$__ 15

*Example 2*

100 parts of the ethylene-propylene copolymer of Example 1 are mixed with 20 parts of the crude divinylbenzene, 2 parts of dicumylperoxide are then added and the whole is homogenized for 10 minutes.

The mixture is vulcanized for 30 minutes at 160° C. in a press with closed molds under a pressure of about 70 kg./cm.$^2$.

The vulcanized product has the following mechanical characteristics determined as described in Example 1:

Ultimate tensile strength _____kg./cm.$^2$__ 114
Elongation at break _____percent__ 440
Modulus at 200% _____kg./cm.$^2$__ 33

*Example 3*

100 parts of the ethylene-propylene copolymer of Example 1 are mixed with 20 parts of a mixture containing 60.5% divinylbenzene, 15.4% ethylvinylbenzene and 24.1% saturated arylalkylhydrocarbons. 20 parts of MPC carbon black and 2 parts of dicumylperoxide are added and the whole is homogenized for 15 minutes. The mass is vulcanized for 30 minutes at 160° C. in a press with closed molds under a pressure of about 70 kg./cm.$^2$.

The vulcanized product has the following mechanical characteristics determined as described in Example 1:

Ultimate tensile strength _____kg./cm.$^2$__ 166
Elongation at break _____percent__ 420
Modulus at 200% _____kg./cm.$^2$__ 49

Example 4

100 parts of the ethylene-propylene copolymer of Example 1 are mixed with 40 parts of a crude divinylbenzene (containing 60.5% divinylbenzene, 15.4% ethylvinylbenzene and 24.1% saturated arylalkyl hydrocarbons), 3 parts of dicumylperoxide are added and the whole is homogenized for 10 minutes.

The mixture is then vulcanized for 30 minutes at 160° C. in a press with closed molds, under a pressure of about 70 kg./cm.$^2$.

The vulcanized product has the following mechanical characteristics, determined as in Example 1:

Ultimate tensile strength _____kg./cm.$^2$__ 128
Elongation at break _____percent__ 345
Modulus at 200% elongation _____kg./cm.$^2$__ 56

Example 5

100 parts of the ethylene-propylene copolymer of Example 1 are mixed with 40 parts of a mixture containing 60.5% divinylbenzene, 15.4% ethylvinylbenzene and 24.1% saturated arylalkyl hydrocarbons. One part of dicumylperoxide is added and the whole is homogenized for 10 minutes.

The mixture is then vulcanized for 30 minutes at 160° C., in a press with closed molds, under a pressure of about 70 kg./cm.$^2$.

The vulcanized product has the following mechanical characteristics, determined as described in Example 1:

Ultimate tensile strength _____kg./cm.$^2$__ 206
Elongation at break _____percent__ 575
Modulus at 200% elongation _____kg./cm.$^2$__ 31

Example 6

100 parts of a linear ethylene-propylene copolymer containing 57% by weight of polypropylene and having a molecular weight of about 200,000 are mixed with 40 parts styrene.

One part dicumylperoxide is added and the whole is homogenized for 10 minutes. The resulting mixture is vulcanized for 30 minutes at 160° C. in a press with closed molds, under a pressure of about 70 kg./cm.$^2$.

The vulcanized product has the following mechanical characteristics, determined as described in Example 1:

Ultimate strength _____kg./cm.$^2$__ 178
Elongation at break _____percent__ 845
Modulus at 200% elongation _____kg./cm.$^2$__ 13

Example 7

100 parts of the ethylene-propylene copolymer of Example 6 are mixed with 40 parts styrene; 2 parts dicumylperoxide are added and the whole is homogenized for 10 minutes.

This mixture is then vulcanized for 30 minutes at 160° C. in a press with closed molds, under a pressure of 70 kg./cm.$^2$.

The vulcanized product has the following mechanical characteristics, determined as described in Example 1:

Ultimate tensile strength _____kg./cm.$^2$__ 166
Elongation at break _____percent__ 755
Modulus at 200% elongation _____kg./cm.$^2$__ 15

As will be apparent, the invention provides new, substantially saturated elastomers (rubber-like material or synthetic rubber) which consist essentially of a combination of an amorphous, linear copolymer of ethylene with propylene or butene-1 with an aliphatic or aromatic polymerizable hydrocarbon containing at least one carbon-to-carbon double bond in its molecule and which is capable of reacting with the copolymer in the presence of an activator which acts with a radical mechanism. Particularly important elastomers are obtained from the copolymers containing monomeric units derived from the alpha-olefins and in which more than 10% of the carbon atoms of the main chain are tertiary carbon atoms.

The elastomers of the invention can be used for all purposes to which rubber-like materials are adapted.

Various changes in details may be made in practicing the invention without departing from the spirit thereof. Therefore, we intend to include in the scope of the appended claims all such modifications as may be apparent to those skilled in the art.

What is claimed is:

1. Transparent, saturated elastomers having a density below 1.0 kg./dm.$^3$ and consisting essentially of the product obtained by heating, at a temperature between 100° C. and 250° C., for from 20 minutes to one hour and under pressure, a mixture consisting essentially of (1) a pre-formed amorphous, linear copolymer of propylene with ethylene containing from 20% to 80% by weight of ethylene in the copolymer macromolecule; (2) an organic peroxy compound as a radical initiator; and (3) a polymerizable monomeric hydrocarbon the polymerization of which is initiated by free radical mechanism and which is selected from the group consisting of divinyl benzene and styrene, the amount of (3) in the mixture being from 5 parts to 40 parts per 100 parts of the pre-formed copolymer (1) and the mixing of (1), (2) and (3) being carried out at a temperature between 30° C. and 70° C.; said elastomers being characterized in that the chains of the copolymer present therein are cross-linked by short chains consisting of units of the polymerizable monomer (3); and in having a relatively low initial elastic modulus, a high ultimate tensile strength and a stress-elongation curve characteristic of products that crystallize under stretch.

2. Elastomers according to claim 1, further characterized in that the monomeric polymerizable hydrocarbon (3) is styrene.

3. Elastomers according to claim 1, further characterized in that the monomeric polymerizable hydrocarbon (3) is divinyl benzene.

4. A process for preparing transparent saturated elastomers having a density below 1.0 kg./dm.$^3$, which comprises mixing (1) a preformed amorphous, linear copolymer of propylene with ethylene containing from 20% to 80% by weight of ethylene in the copolymer macromolecule, (2) an organic peroxy compound as a radical initiator, and (3) from 5 to 40 parts by weight per 100 parts of the copolymer of a polymerizable monomeric hydrocarbon the polymerization of which is initiated by free radical mechanism and which is selected from the group consisting of divinyl benzene and styrene at a temperature between 30° C. and 70° C. and then heating the mixture under pressure at a temperature of from 100° C. to 250° C. for from 20 minutes to one hour, and until the chains of the copolymer (1) are cross-linked by short chains consisting of units of the polymerizable monomer (3).

5. The process according to claim 4, further characterized in that the polymerizable monomer (3) is styrene.

6. The process according to claim 4, further characterized in that the polymerizable monomer (3) is divinyl benzene.

References Cited by the Examiner

UNITED STATES PATENTS

| | | | |
|---|---|---|---|
| 2,180,082 | 11/39 | Mueller-Cunradi | 260—45.5 |
| 2,282,002 | 5/42 | Scott et al. | 260—45.5 |
| 2,405,817 | 8/46 | D'Alelio | 260—45.5 |
| 2,609,353 | 9/52 | Rubens et al. | 260—45.5 |
| 2,610,962 | 9/52 | Smyers et al. | 260—45.5 |
| 2,837,496 | 6/58 | Vandenberg | 260—45.5 |
| 2,882,263 | 4/59 | Natta et al. | |

FOREIGN PATENTS 593,072   10/47   Great Britain.

LEON J. BERCOVITZ, *Primary Examiner.*

D. ARNOLD, *Examiner.*